United States Patent [19]

Kemnitz et al.

[11] Patent Number: 5,081,967
[45] Date of Patent: Jan. 21, 1992

[54] PISTON WITH SEPARATE HEAD AND SKIRT

[75] Inventors: Peter Kemnitz, Kernen; Emil Ripberger, Remseck, both of Fed. Rep. of Germany

[73] Assignee: Mahle GmbH, Stuttgart, Fed. Rep. of Germany

[21] Appl. No.: 694,415

[22] Filed: May 1, 1991

[30] Foreign Application Priority Data

May 8, 1990 [DE] Fed. Rep. of Germany ....... 4014705

[51] Int. Cl.⁵ .............................. F02F 3/22; F02F 3/26
[52] U.S. Cl. .................................. 123/193 P; 92/208; 92/233; 92/177
[58] Field of Search .............. 123/193 P; 92/186, 158, 92/159, 208, 233, 177

[56] References Cited

U.S. PATENT DOCUMENTS

| | | | |
|---|---|---|---|
| 2,601,344 | 6/1952 | Townhill | 92/233 |
| 4,648,309 | 3/1987 | Schellmann | 92/233 |
| 4,704,950 | 11/1987 | Ripberger et al. | 92/208 |
| 4,756,241 | 7/1988 | Sakurahara et al. | 92/233 |
| 4,831,919 | 5/1989 | Bruni | 92/233 |
| 4,947,805 | 8/1990 | Steppat et al. | 92/159 |

Primary Examiner—Raymond A. Nelli
Assistant Examiner—M. Macy
Attorney, Agent, or Firm—Collard, Roe & Galgano

[57] ABSTRACT

A piston for an internal combustion engine with a separate head and skirt which are joined by a piston pin. The ring belt extends downward from the head and terminates above the pin. The space between the lower edge of the ring belt and a section of the head defines a cooling oil ring space. A depression is formed in the head and is partly defined by the section. The section has a thickness of between four percent and seven percent of the piston diameter, corresponding to an angle of zero to sixty degrees of the section with respect to a vertical longitudinally extending line. The thickness of the head above the space is six percent to twelve percent of the piston diameter. The top of the space is below the top ring groove. Above the second ring groove, the ring belt has a thickness of greater than two and one-half percent of the piston diameter.

12 Claims, 2 Drawing Sheets

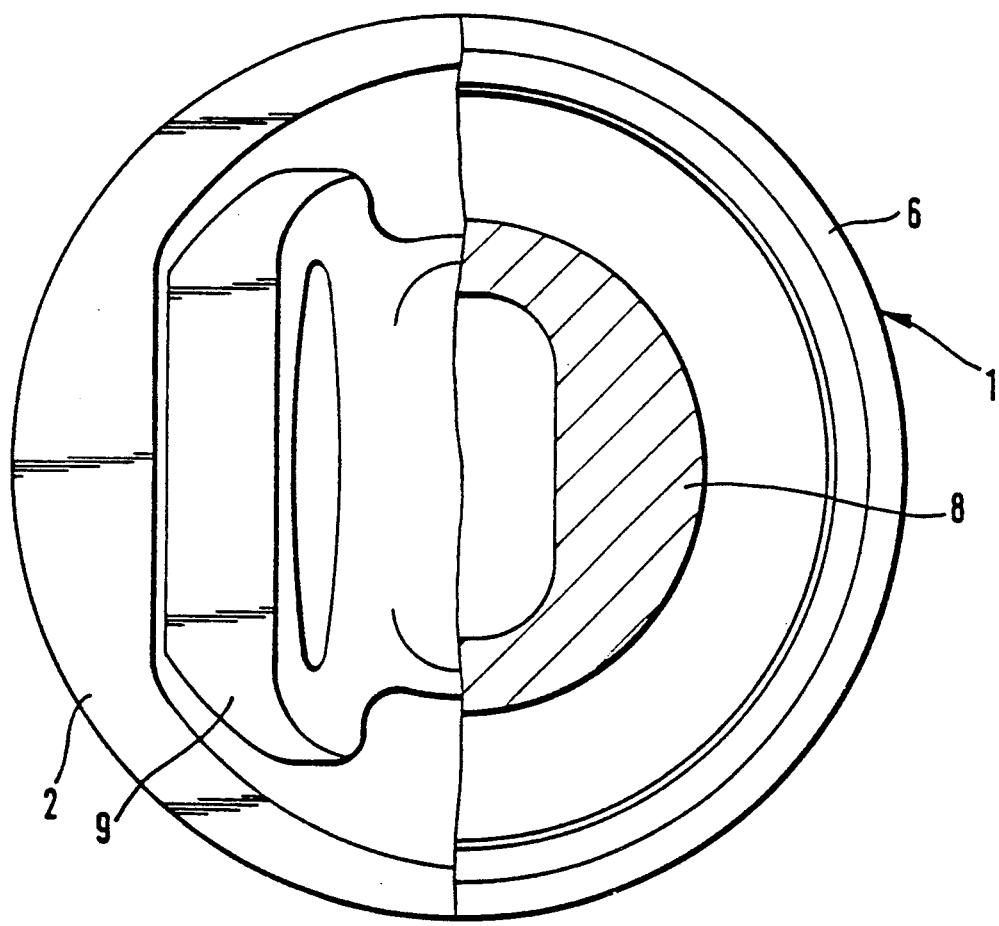

PISTON WITH SEPARATE HEAD AND SKIRT

BACKGROUND OF THE INVENTION

1. Field of the Invention

The invention relates to a cooled piston for internal combustion engines with a separate piston head and piston skirt. More particularly, it relates to a steel or iron piston head joined to the piston skirt by means of the piston pin.

SUMMARY OF THE INVENTION

It is an object of the present invention to provide a piston which has improved efficiency and heat transfer from the piston head.

These and other related objects are attained according to the invention by a piston for internal combustion engines with a separate piston head and piston skirt. The steel or iron head is joined to the skirt by means of the piston pin. A ring belt, into which the ring grooves are set, projects downward from the head and terminates above the pin. The ring belt defines an outer border of a cooling oil ring space. The inner border of the ring space is defined by a section of the head which is an extension of the piston base. This section is located over two hubs which form a mount for the pin. A depression is formed in the head and base and is partly defined by the section.

From the top of the cooling oil ring space to the surface of the head a thickness of between six and twelve percent of the piston diameter is provided. This thickness and the placement of the top or first ring groove is designed so that the ring space remains axially below the top groove.

The thickness of the ring belt above the second groove is greater than two and a half percent of the piston diameter. The thickness of the section between the depression and the cooling oil ring space is between four and seven percent of the piston diameter.

The dimensions and configuration of the ring space and ring belt are designed to transfer as much heat penetrating into the piston base from the combustion gases to the engine cylinder via the piston rings as possible. This ensures that the cooling oil within the ring space is not excessively heated, due to contact with the inner border of the ring space which faces the piston base. This reduces deterioration of the oil as well as oil residue formation at the upper wall of the ring space.

With the combination of features described, the strength and stiffness against deformation are positively influenced. The thickness of the ring belt above the second groove should also be considered in terms of the aforementioned characteristics, with particular consideration given to the strength. Preferably, at least one of the compression ring grooves has an upper ring groove side which is angled up at the edge. A perfect seal with the rings is ensured, as the piston base becomes slightly convex or expanded due to the heat during engine operation.

Advantageously, the outer edge of the ring belt is slightly oval. This provides good guidance for the head in the cylinder bore of the engine. This can prevent engine seizure.

BRIEF DESCRIPTION OF THE DRAWINGS

Other objects and features of the present invention will become apparent from the following detailed description considered in connection with the accompanying drawing which discloses an embodiment of the present invention. It should be understood, however, that the drawing is designed for the purpose of illustration only and not as a definition of the limits of the invention.

FIG. 2 is a bottom elevational view, in part section.

DETAILED DESCRIPTION OF PREFERRED EMBODIMENTS

Figure 1:
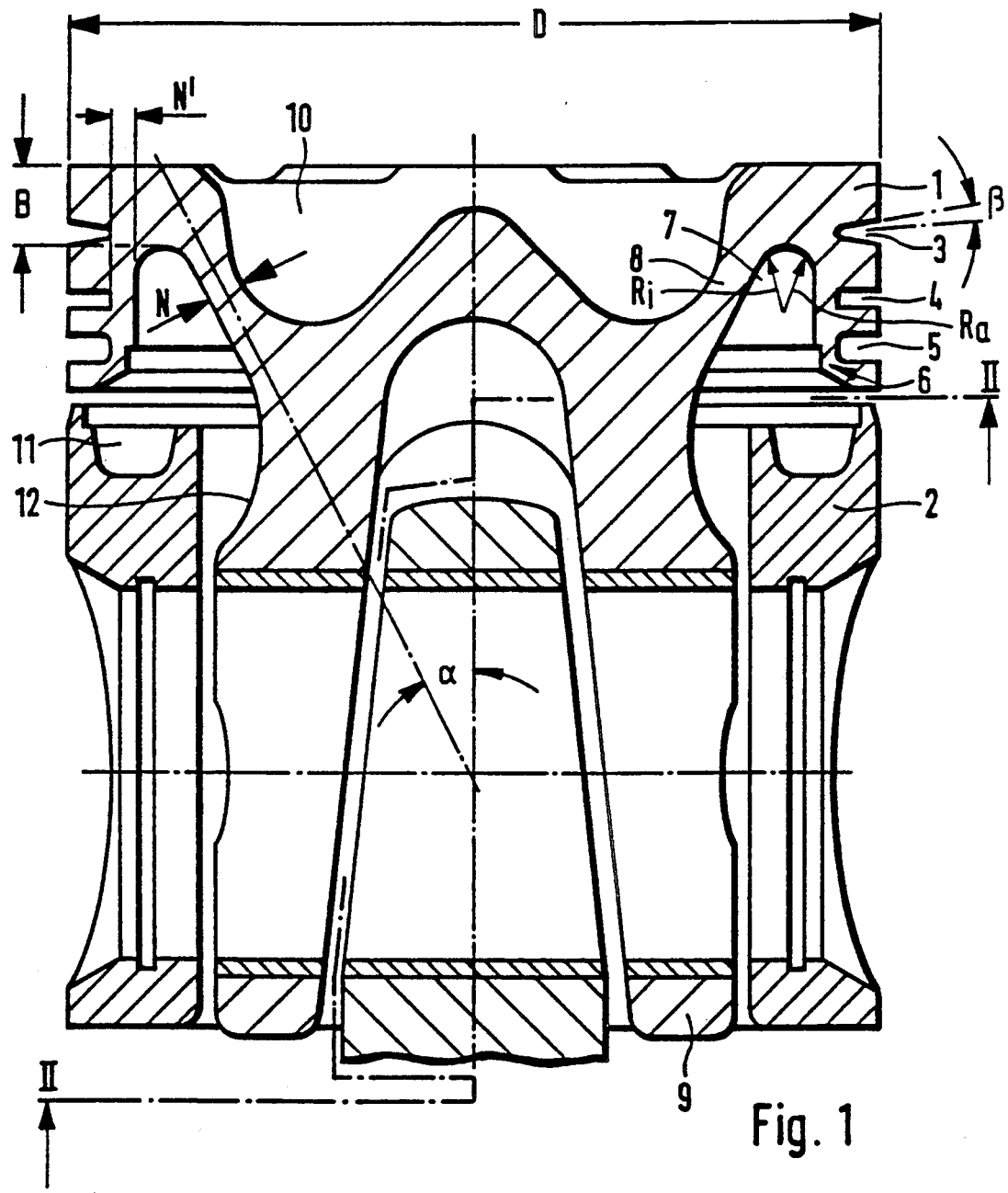
FIG. 1 is a longitudinal cross-sectional view of a piston head and skirt embodying the present invention.

Turning now in detail to the drawings, and, in particular, FIGS. 1 and 2, there is illustrated a piston, embodying the present invention consisting of a piston head 1, for example, made from forged steel or iron, and a piston skirt 2, for example, made from aluminum. For example, the piston can have a diameter of D=120 mm.

Head 1 and skirt 2 are connected together by means of a piston pin (not shown for reasons of clarity) and joined to the connecting rod of the engine. A ring belt 6, in which ring grooves 3, 4 and 5 are set, extends downward from head 1. It is radially distanced form the piston base and ends axially a short distance above skirt 2.

Ring belt 6 defines an outer border of a cooling oil ring space 7, which has an open bottom end. The bottom end can also be closed, i.e., connected to the head. The inner border of cooling oil ring space is defined by a section 8 of the head which extends from the piston base. Hubs 9 hold the molded piston pin on either side.

In the center of the piston head and base there is a depression 10, which in part is adjacent to section 8. Section 8 has an incline angle o in the range of 0 to 60°, for example. Ideally, angle $\alpha$ is 20°. The wall thickness N of section 8 is generally in the range of four to seven percent of the piston diameter corresponding to an angle $\alpha$ of 0° to 60°. The preferred thickness is six percent of the piston diameter. The thickness B of the piston base above the ring space 7 is generally in the range of six to twelve percent of the piston diameter. The preferred thickness is ten percent. This thickness and the placement of the top or first ring groove is designed so that the ring space remains axially below the top groove.

The minimum wall thickness N' of the ring belt is 2.5 percent of the piston diameter. The incline $\beta$ for the upper ring groove side is generally ten minutes, e.g., a half keystone, with a groove angle of ten minutes.

Preferably, the ring belt is oval in shape. The difference in the longest and shortest oval diameters amounts to 0.2 percent of the piston diameter.

Oil catch pockets 11 are located at the top of skirt 2 facing towards the piston head. Thus, cooling oil exiting from the cooling oil ring space 7 is caught and returned to ring space 7. In the region in which section 8 meets hubs 9, a cylindrical constriction 12 is provided. Construction 12 can be machined or cut, for example.

While only one embodiment of the present invention has been shown and described, it is to be understood that many changes and modifications may be made thereunto without departing from the spirit and scope of the invention as defined in the appended claims.

What is claimed is:

1. In an improved piston for an internal combustion engine with a separate head and skirt which are joined by a piston pin, rings, a ring belt in which ring grooves, each having an upper and lower side, are set, extends downward from the head and terminates above the pin, the ring belt defines an outer border of a cooling oil ring space, a section of the head extending from the piston base defines the inner border of the space, the section is located over two hubs which form a mount for the pin, a bottom free end of the ring belt is detached from the head, a depression is formed in the head and is partly defined by the head section, the improvement comprising:

the head section having a thickness in the range of four to seven percent of the piston diameter, the thickness of 4% corresponding to an angle 0° of the head section with respect to a vertical longitudinally extending line passing through the center of the piston, the thickness of 7% corresponding to an angle 60° of the head section, the thicker increasing from 4% to 7% as the angle increases from 0° to 6°.

the top of the ring space defining a plane which is parallel to the top of the head, the distance between the plane and the top of the head being in the range of 6–12 percent of the piston diameter, the plane being positioned below the lower side of the uppermost ring groove; and wherein the ring belt has a thickness greater than two and a half percent of the piston diameter in an area above the lower side of the second ring groove from the top of the head.

2. The piston according to claim 1, wherein the head is made of steel.

3. The piston according to claim 1, wherein the head is made of iron.

4. The piston according to claim 1, wherein the skirt is made of aluminum.

5. The piston according to claim 1, wherein the bottom end of the ring belt is connected to the head.

6. The piston according to claim 1, wherein the ring space opens into the piston base via a radially inside rounded radius and a radially outside rounded radius ($R_1$ and $R_2$, respectively), both of which are at least $R = 3$ mm.

7. The piston according to claim 6, wherein the inside rounded radius $R_1$ is greater than the outside rounded radius $R_2$, and wherein $R_1$ is at least 4 mm.

8. The piston according to claim 1, wherein the upper side of at least one of the uppermost two grooves has a positive groove angle in the cold state so that in the hot state, when the head becomes expanded the narrower portion of the groove presses against the ring, thus providing an improved seal.

9. The piston according to claim 1, wherein the outside of the ring belt is oval shaped, the smaller diameter of the oval generally lying in the same direction as the pin axis.

10. The piston according to claim 1, comprising a cylindrical constriction machined in the region where the head section meets the hubs.

11. The piston according to claim 1, wherein the head section has a thickness of six percent of the piston diameter and an angle of twenty percent with respect to a vertical longitudinally extending line passing through the center of the piston.

12. The piston according to claim 11, wherein the distance between the plane and the top of the head is ten percent of the piston diameter.

* * * * *